United States Patent
Zhang et al.

(10) Patent No.: US 11,336,755 B2
(45) Date of Patent: May 17, 2022

(54) PDCP LAYER ACTIVE PROTOCOL STACK IMPLEMENTATION TO REDUCE HANDOVER INTERRUPTION

(71) Applicant: MediaTek Singapore Pte. Ltd., Singapore (SG)

(72) Inventors: Yuanyuan Zhang, Beijing (CN); Chia-Chun Hsu, Hsin-Chu (TW); Li-Chuan Tseng, Hsin-Chu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/923,086

(22) Filed: Jul. 8, 2020

(65) Prior Publication Data
US 2021/0014764 A1 Jan. 14, 2021

Related U.S. Application Data

(63) Continuation of application No. PCT/CN2019/095854, filed on Jul. 12, 2019, and a
(Continued)

(51) Int. Cl.
*H04W 4/00* (2018.01)
*H04L 69/18* (2022.01)
(Continued)

(52) U.S. Cl.
CPC .............. *H04L 69/18* (2013.01); *H04L 69/22* (2013.01); *H04W 12/041* (2021.01);
(Continued)

(58) Field of Classification Search
None
See application file for complete search history.

(56) References Cited

U.S. PATENT DOCUMENTS

2017/0215225 A1 7/2017 Yi
2017/0264562 A1 9/2017 Yi .................. H04W 47/30
(Continued)

FOREIGN PATENT DOCUMENTS

KR WO2016/159634 A1 4/2015
WO WO2018/141230 A1 2/2017

OTHER PUBLICATIONS

Huawei, HiSilicon, "comparison of 0ms interruption solutions," 3GPP TSG-RAN WG2 Ad Hoc NR #2 Qingdao,China; Jun. 27-29, 2017; R2-1706707,pp. 1-8.*
(Continued)

*Primary Examiner* — Zewdu A Beyen
(74) *Attorney, Agent, or Firm* — Helen Mao; Zheng Jin; Imperium Patent Works

(57) ABSTRACT

Apparatus and methods are provided to support dual active protocol stacks (DAPS) to reduce mobility interruption time in both LTE and NR system. In novel aspect, the PDCP reconfiguration includes reconfiguring a normal PDCP to an DAPS PDCP for DAPS such that the DAPS PDCP is associated with both the source cell and the target cell, and reconfiguring an DAPS PDCP to the a normal PDCP by releasing the association with the source cell. In one embodiment, the PDCP entity receives a PDCP reconfiguration request from upper layers of the UE configured with DAPS establishes a header compression protocol, a ciphering function, and an integrity protection function for the target cell. In one embodiment, the PDCP reconfiguration request triggers the DAPS PDCP to be released. The DAPS PDCP resets and releases the source header compression, ciphering and integrity protection functions.

18 Claims, 12 Drawing Sheets

Related U.S. Application Data continuation of application No. PCT/CN2019/095059, filed on Jul. 8, 2019.

(51) Int. Cl.

| | | |
|---|---|---|
| *H04W 36/08* | (2009.01) | |
| *H04L 69/22* | (2022.01) | |
| *H04W 12/106* | (2021.01) | |
| *H04W 76/30* | (2018.01) | |
| *H04W 12/041* | (2021.01) | |
| *H04W 12/10* | (2021.01) | |
| *H04W 28/06* | (2009.01) | |
| *H04W 36/32* | (2009.01) | |
| *H04W 80/02* | (2009.01) | |
| *H04W 80/08* | (2009.01) | |

(52) U.S. Cl.
CPC ......... *H04W 12/10* (2013.01); *H04W 12/106* (2021.01); *H04W 28/06* (2013.01); *H04W 36/08* (2013.01); *H04W 36/32* (2013.01); *H04W 76/30* (2018.02); *H04W 80/02* (2013.01); *H04W 80/08* (2013.01)

(56) References Cited

U.S. PATENT DOCUMENTS

| | | | |
|---|---|---|---|
| 2017/0339609 A1 | 11/2017 | Youn et al. | H04W 36/0083 |
| 2018/0146504 A1* | 5/2018 | Xiao | H04W 76/16 |
| 2020/0229054 A1 | 7/2020 | Lee | H04W 8/02 |
| 2020/0314714 A1* | 10/2020 | Jung | H04W 76/30 |
| 2020/0314716 A1 | 10/2020 | Kim | H04W 36/0058 |
| 2020/0367101 A1 | 11/2020 | Paladugu | H04W 36/0055 |
| 2021/0099930 A1 | 4/2021 | Yao | H04W 36/03 |

OTHER PUBLICATIONS

Taiwan IP Office Written Opinion and search report for application 109122496, dated Jul. 16, 2021, 8 pages. No English translation available.

USPTO OA for related U.S. Appl. No. 16/923,082, mailed on Sep. 13, 2021.

Taiwan Intellectual Property Office Action, dated Dec. 10, 2021 (7 pages).

Intel Corp, MediaTek Inc, OPPO, Google Inc. vivo, ETRI, CATT, China Telcom, Xiaomi, Charter Communications, ASUSTek "Non-DC based solution for 0ms interruption time", R2-1906281, 3GPP TSG RAN WG2 meeting 106, Reno, USA May 13-17, 2019.

\* cited by examiner

PDCP LAYER ACTIVE PROTOCOL STACK IMPLEMENTATION TO REDUCE HANDOVER INTERRUPTION

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2019/095059, titled "APPARATUS AND METHOD OVER PDCP LAYER TO REALIZE DUAL ACTIVE PROTOCOL STACK TO REDUCE HANDOVER INTERRUPTION," with an international filing date of Jul. 8, 2019, and from International Application No. PCT/CN2019/095854, titled "APPARATUS AND METHOD TO CONTROL MOBILITY PROCEDURE TO REDUCE HANDOVER INTERRUPTION", with an international filing date of Jul. 12, 2019. This application claims priority under 35 U.S.C. § 119 from Chinese Application Number CN 202010574767.0 titled "PDCP LAYER ACTIVE PROTOCOL STACK IMPLEMENTATION TO REDUCE HANDOVER INTERRUPTION" filed on Jun. 22, 2020, and Chinese Application Number CN 202010580424.5 titled "PDCP LAYER ACTIVE PROTOCOL STACK IMPLEMENTATION TO REDUCE HANDOVER INTERRUPTION" filed on Jun. 23, 2020. The disclosure of each of the foregoing documents is incorporated herein by reference. The disclosure of each of the foregoing documents is incorporated herein by reference.

TECHNICAL FIELD

The disclosed embodiments relate generally to wireless communication, and, more particularly, to reduce mobility interruption time through dual protocol stacks in the new radio access system.

BACKGROUND 5G radio access technology will be a key component of the modern access network. It will address high traffic growth and increasing demand for high-bandwidth connectivity. It will also support massive numbers of connected devices and meet the real-time, high-reliability communication needs of mission-critical applications. Both the standalone NR deployment and non-standalone NR with LTE/eLTE deployment will be considered. In order to improve the UE experience quality, it's desirable to reduce the mobility interruption time during handover. Mobility interruption time means the shortest time duration supported by the system during which a user terminal cannot exchange user plane packets with any base station during transitions. The target for mobility interruption time should be 0 ms or close to 0 ms, which is intended for both intra-frequency and inter-frequency mobility for intra-NR mobility.

In the current LTE system, the latency during handover execution is nearly 50 ms, which cannot satisfy the mobility interruption requirement in the NR system. Solutions, such as RACH-less handover and make-before-break procedures, are proposed to reduce the mobility interruption. Though the handover interruption with these solutions can be reduced, the interruption due to random access procedure and delivering of signal messages cannot be avoided. These solutions alone cannot meet the latency requirements.

Improvements and enhancements are required to reduce mobility interruption with dual protocol stack to zero or close to zero.

SUMMARY

Apparatus and methods are provided to support dual active protocol stacks (DAPS) to reduce mobility interruption time in both LTE and NR system. In novel aspect, the PDCP reconfiguration includes reconfiguring a normal PDCP to an DAPS PDCP for a DAPS bearer such that the DAPS PDCP is associated with both the source cell and the target cell, and reconfiguring an DAPS PDCP to the a normal PDCP by releasing the association with the source cell. In one embodiment, the PDCP entity receives a PDCP reconfiguration request from upper layers of the UE, wherein the UE is connected with a source cell in the wireless network, and wherein the UE is configured with DAPS associated with the source cell and a data radio bearer for a target cell, establishes a header compression protocol and applying a header compression configuration provided by upper layers for the target cell, a cipher function and applying a cipher algorithm and key provided by upper layers for the target cell, and establishes an integrity protection function and applying an integrity protection algorithm and key provided by upper layers for the target cell. In one embodiment, the PDCP reconfiguration request is triggered by receiving a handover command with a DAPS configuration flag dapsConfig. In another embodiment, the PDCP entity switches header compression, integrity protection and cipher functions associated to the source cell to header compression, integrity protection and cipher functions associated to the target cell upon receiving a switching request from lower layers. In yet another embodiment, lower layers send the switching request upon receiving a first UL grant from the target cell. In one embodiment, the PDCP entity upon PDCP reconfiguration enables the PDCP reordering and reordering the packets received from both of the lower layers associated to the source cell and the target cell, wherein the on-going PDCP reordering procedure is not interrupted and t-Reordering keeps as it is if the PDCP reordering function is used before the receiving PDCP entity is extended. In one embodiment, the PDCP reconfiguration involves establishing a header decompression protocol and applying a header decompression configuration provided by upper layers for the target cell, establishing a decipher function and applying a cipher algorithm and key provided by upper layers for the target cell. The PDCP reconfiguration enables a PDCP reordering and reordering packets received from lower layers associated to the source cell and the target cell.

In one embodiment, the PDCP reconfiguration request triggers the DAPS PDCP to be changed to normal PDCP. The PDCP entity receives a PDCP reconfiguration request from upper layers of the UE, wherein the UE is configured with a DAPS associated with a source cell and a target cell, and wherein a radio link control (RLC) entity associated with the PDCP entity is released for a radio bearer, releases a header compression protocol associated with the released RLC entity, releases a cipher function associated with the released RLC entity for the radio bearer, and releases a header compression protocol associated with the released RLC entity for the radio bearer. In one embodiment, the released RLC entity is associated with the source cell. In another embodiment, the PDCP entity further releases a header decompression protocol associated with the released RLC entity, a decipher function associated with the released RLC entity for the radio bearer, and a header decompression protocol associate with the released RLC entity for the radio bearer. In yet another embodiment, the PDCP entity stops and resets t-Reordering when configured.

In another novel aspect, upon detecting a DAPS indication flag indicating to maintain a u-plane (UP) protocol of a source cell with a source MAC entity while performing handover to a target cell, the UE creates a target MAC entity for the target cell, reconfigures a radio link control (RLC) entity to associate with data radio bearers (DRBs) of the target cell, and reconfigures a packet data convergence protocol (PDCP) entity to associate with the RLC entity associated with the target cell. In one embodiment, DAPS flag is detected when receiving at least one indication comprising a dapsConfig flag carried by mobilityControlInfo and a spCellConfig with reconfigurationWithSync. In another embodiment, the created MAC entity is a master cell group (MCG) MAC entity, and wherein the UE maintains a source MCG MAC entity and a target MCG MAC entity. In yet another embodiment, the PDCP entity is reconfigured to establish a target header compression and a header decompression protocol to apply a header compression and decompression configuration for the target cell, a target cipher function to apply a cipher algorithm and key provided for the target cell, and a target integrity protection function to perform integrity protection and integrity verification for the target cell. In one embodiment, parameters for the target header compression are included in pdcp-Config, which is extended to provide the header compression parameters for the target cell. In another embodiment, the PDCP entity is reconfigured to process all configured DRBs with pdcp-Config that are established, and wherein the PDCP entity is reconfigured to associate with the target RLC entity and an associated logical channel for all those DRBs. In one embodiment, PDCP entity is reconfigured to associate with DRBs when a dapsConfig is configured, and wherein the PDCP entity is reconfigured to associate with the target RLC entity and an associated logical channel for all those DRBs. In another embodiment, the dapsConfig is provided in pdcp-Config. In one embodiment, the UE further associates the target RLC entity and logical channels with the reconfigured PDCP entity with a same drb-Identity value. In another embodiment, the UE associates the target RLC entity and logical channel with target keys and algorithm provided by a reconfiguration message and associates the target RLC entity and logical channel with a target header compression protocol for each DRB. In one embodiment, the UE releases the source MAC entity and a connection with the source cell upon receiving a DAPS source release indication e.g. daps-SourceRelease. In another embodiment, the UE releases the RLC entities and the associated logical channels of the source cell and reconfigures the DAPS PDCP entities to normal PDCP entities.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
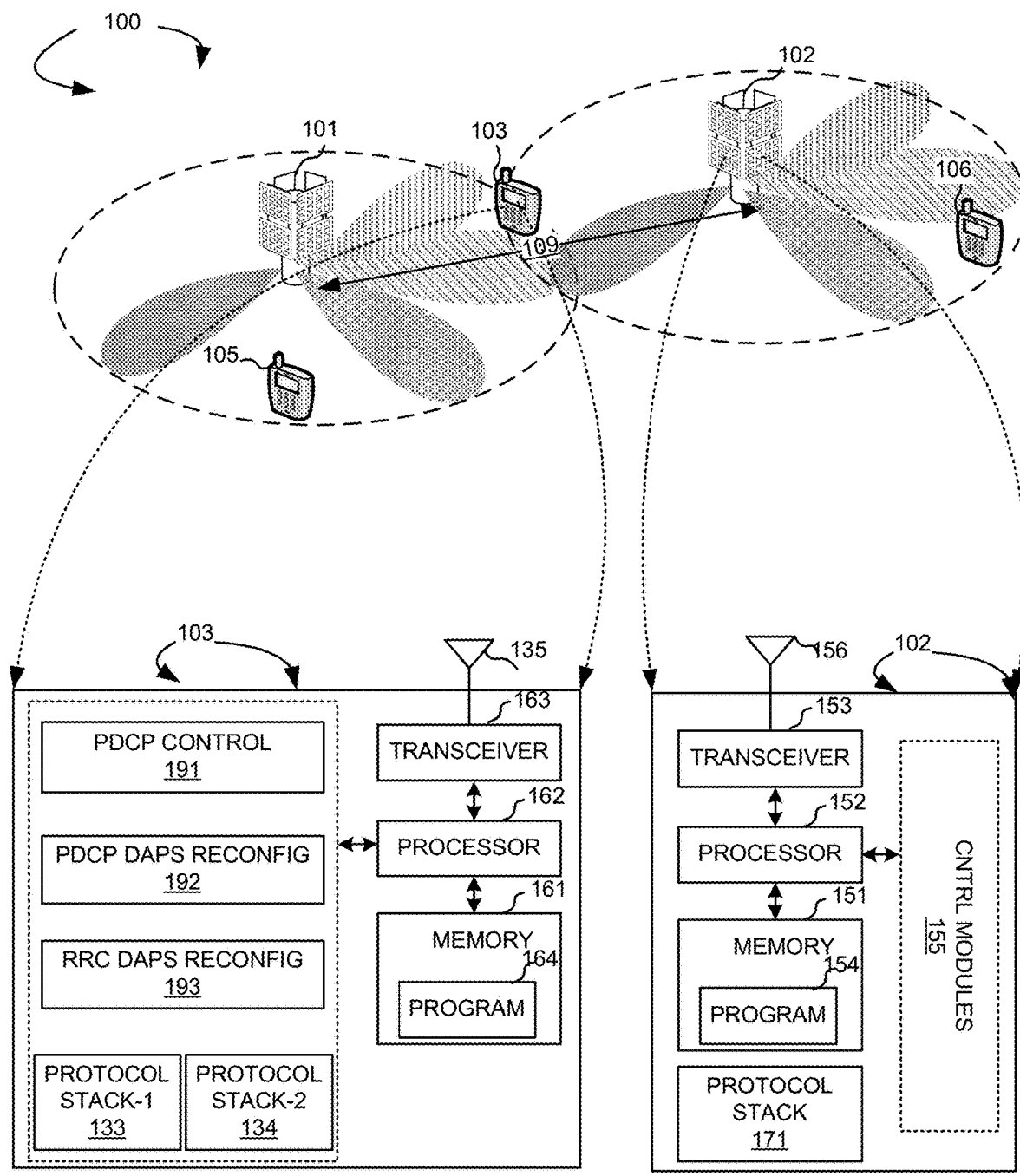
FIG. 1 is a schematic system diagram illustrating an exemplary wireless network for mobility interruption reduction with dual-stack in accordance with embodiments of the current invention.

FIG. 1 is a schematic system diagram illustrating an exemplary wireless network (system) 100 for mobility interruption reduction with dual-stack in accordance with embodiments of the current invention. Wireless system 100 includes one or more fixed base infrastructure units forming a network distributed over a geographical region. The base infrastructure unit may also be referred to as an access point, an access terminal, a base station, a Node-B, an eNode-B, a gNB, or by other terminology used in the art. The network can be homogeneous network or heterogeneous network, which can be deployed with the same frequency or different frequency. gNB 101 and gNB 102 are base stations in the NR network, the serving area of which may or may not overlap with each other. As an example, user equipment (UE) 105 or mobile station 105 is only in the service area of gNB 101 and connected with gNB 101. UE 105 is connected with gNB 101 only. Similarly, UE 106 is only in the service area of gNB 102 and connected with gNB 102. UE 106 is connected with gNB 102 only. gNB 101 is connected with gNB 102 via Xnr interface 109. UE 103 is in the overlapping service area of gNB 101 and gNB 102. In one embodiment, UE 103 is configured with dual protocol stacks and can be connected with gNB 101 and gNB 102 simultaneously.

FIG. 1 further shows simplified block diagrams of gNB 102 and mobile station/UE 103 in accordance with the current invention. gNB 102 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 102. Memory 151 stores program instructions and data 154 to control the operations of gNB 102. gNB 102 has a protocol stack 171. gNB 102 also includes a set of control modules 155 that carry out functional tasks to communicate with mobile stations.

UE 103 has an antenna 135, which transmits and receives radio signals. An RF transceiver circuit 163, coupled with the antenna, receives RF signals from antenna 135, converts them to baseband signals, and sends them to processor 162. In one embodiment, the RF transceiver may comprise two RF modules (not shown). A first RF module is used for HF transmitting and receiving, and the other RF module is used for different frequency bands transmitting and receiving which is different from the HF transceiver. RF transceiver 163 also converts received baseband signals from processor 162, converts them to RF signals, and sends out to antenna 135. Processor 162 processes the received baseband signals and invokes different functional modules to perform features in UE 103. Memory 161 stores program instructions and data 164 to control the operations of UE 103. Antenna 135 sends uplink transmission and receives downlink transmissions to/from antenna 156 of gNB 102. Mobile station 103 also includes a protocol stack-1 133 and a protocol stack-2 134. Protocol stack 133 and 134 includes lower layers and upper layers. In one embodiment, the upper layers include SDAP layer and TCP/IP layer for data and RRC layer for the control plane. In one embodiment, the lower layers include MAC layer.

Mobile station 103 also includes a set of control modules that carry out functional tasks. These control modules can be implemented by circuits, software, firmware, or a combination of them. A PDCP entity/control/module 191 receives a PDCP reconfiguration request from upper layers of the UE, wherein the UE is connected with a source cell in the wireless network, and wherein the UE is configured with a dual active protocol stack (DAPS) associated with the source cell and a data radio bearer for a target cell. A PDCP DAPS reconfiguration entity/module 192 establishes a header compression protocol and applies a header compression configuration provided by upper layers for the target cell, establishes a cipher function and applies a cipher algorithm and key provided by upper layers for the target cell, and establishes an integrity protection function and applies an integrity protection algorithm and key provided by upper layers for the target cell. A RRC DAPS reconfiguration 193 detects a DAPS flag indicating to maintain a user plane (UP) protocol of a source cell while performing handover to a target cell in the wireless network, creates a target MAC entity for the target cell, establishes a target radio link control (RLC) entity associated with the target cell, reconfiguring a packet data convergence protocol (PDCP) entity as DAPS PDCP entity, and reconfigures the PDCP entity to associate with the RLC entity of the target cell.

Figure 2:
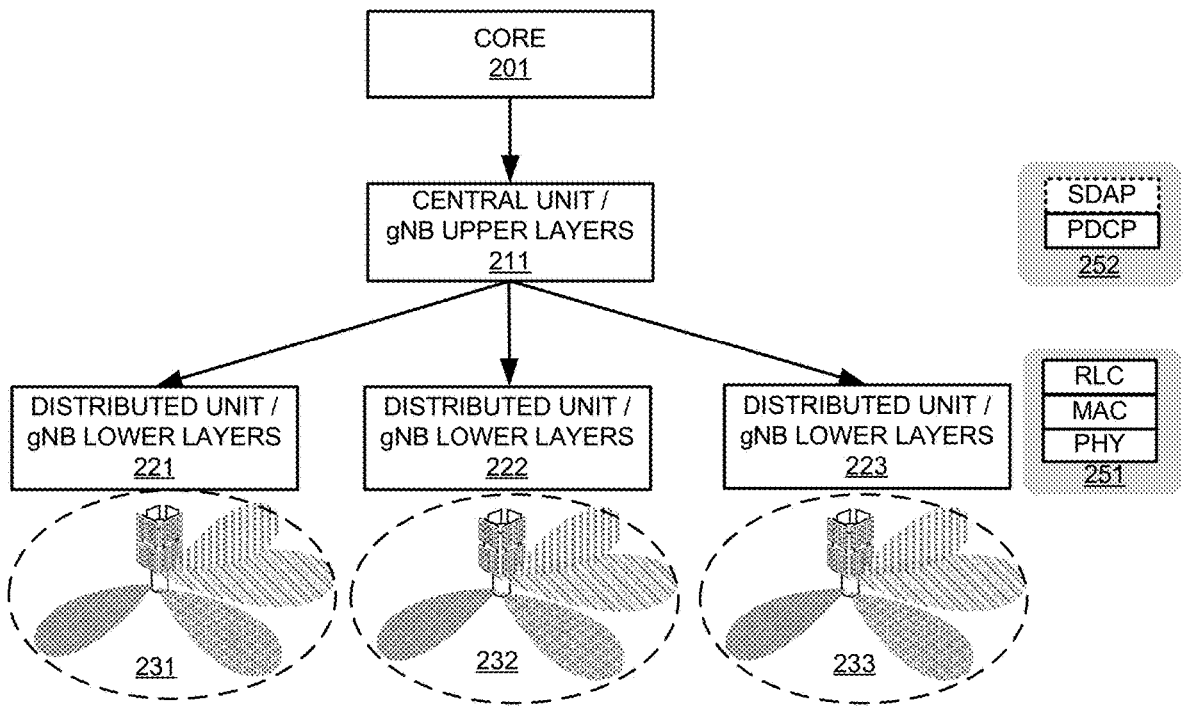
FIG. 2 illustrates an exemplary NR wireless system with centralization of the upper layers of the NR radio stacks in accordance with embodiments of the current invention.

FIG. 2 illustrates an exemplary NR wireless system with centralized upper layers of the NR radio interface stacks in accordance with embodiments of the current invention. Different protocol split options between central unit and lower layers of gNB nodes may be possible. The functional split between the central unit and lower layers of gNB nodes may depend on the transport layer. Low performance transport between the Central Unit and lower layers of gNB nodes can enable the higher protocol layers of the NR radio stacks to be supported in the Central Unit, since the higher protocol layers have lower performance requirements on the transport layer in terms of bandwidth, delay, synchronization and jitter. In one embodiment, SDAP and PDCP layer are located in the central unit, while RLC, MAC and PHY layers are located in the distributed unit. A Core unit 201 is connected with one central unit 211 with gNB upper layer 252. In one embodiment, gNB upper layer 252 includes the PDCP layer and optionally the SDAP layer. Central unit 211 is connected with distributed units 221, 222, and 223. Distributed units 221, 222, and 223 each corresponds to a cell 231, 232, and 233, respectively. The distributed units, such as 221, 222 and 223 includes gNB lower layers 251. In one embodiment, gNB lower layers 251 include the PHY, MAC and the RLC layers.

Figure 3:
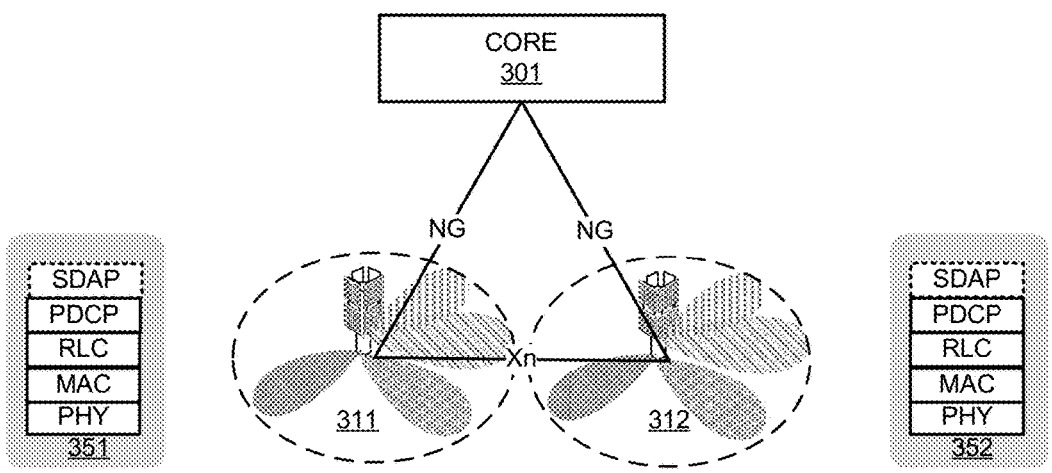
FIG. 3 illustrates exemplary NR wireless system supporting inter gNB mobility scenario in accordance with embodiments of the current invention.

FIG. 3 illustrates exemplary NR wireless system supporting inter gNB mobility scenario in accordance with embodiments of the current invention. The intra-RAT handover is normally based on Xn-based handover. HO is performed between gNBs through Xn interface, which are connected to the NR core network. Each gNB has the protocol stacks including SDAP, PDCP, RLC, MAC and PHY layers. A gNB 311 and a gNB 312 are both 5G gNBs with a protocol stack 351 and 352, respectively. gNB 311 and gNB 312 connects with the Core 301 via NG connection. gNB 311 and gNB 312 connect with each other via Xn interface. Protocol stacks 351 and 352 includes PHY, MAC, RLC, PDCP and optionally SDAP.

In one novel aspect, two types of PDCP entities are used. One is the normal PDCP and the other one is the extended PDCP or DAPS PDCP. The DAPS PDCP entity is either the transmitting PDCP entity or the receiving PDCP entity, which is extended to perform more functions based on the normal PDCP entity. The DAPS PDCP entity can perform data transmission/reception simultaneously with the peer PDCP entities of both the source cell and the target cell. A UE supports both the normal PDCP entity and the DAPS PDCP entity and reconfigures the PDCP entity from the normal PDCP entity to the DAPS PDCP and vice versa based on DAPS reconfiguration indications or messages detected.

In another novel aspect, The UE detects a DAPS indication, such as a HO command with a dapsConfig flag indicating that the UE needs to perform simultaneous transmission/reception with both the source cell and the target cell during the HO procedure. Therefore, UE needs to continue data transmission/reception with the source cell when performing random access with the target cell. Upon reception of the HO command, UE keeps the UP protocol for the source cell. The UE does not reset the master cell group (MCG) MAC entity for the source cell. For the source cell, The UE does not re-establish PDCP for the DRBs and does not re-establish RLC for the DRBs. For the target cell, the UE creates a target MAC entity and establishes RLC entity for the target cell.

In one novel aspect, the UE reconfigures the normal PDCP to DAPS PDCP. In one embodiment, the DAPS PDCP entity includes both DAPS PDCP transmitting entity and DAPS PDCP receiving entity. It includes two security handling modules and can perform integrity protection/verification separately for the source cell and the target cell. In another embodiment, it includes two ciphering modules and can perform ciphering/deciphering separately for the source cell and the target cell. In another embodiment, the DAPS PDCP entity further includes two header compression modules and can perform header compression/decompression separately for the source cell and the target cell.

Figure 4:
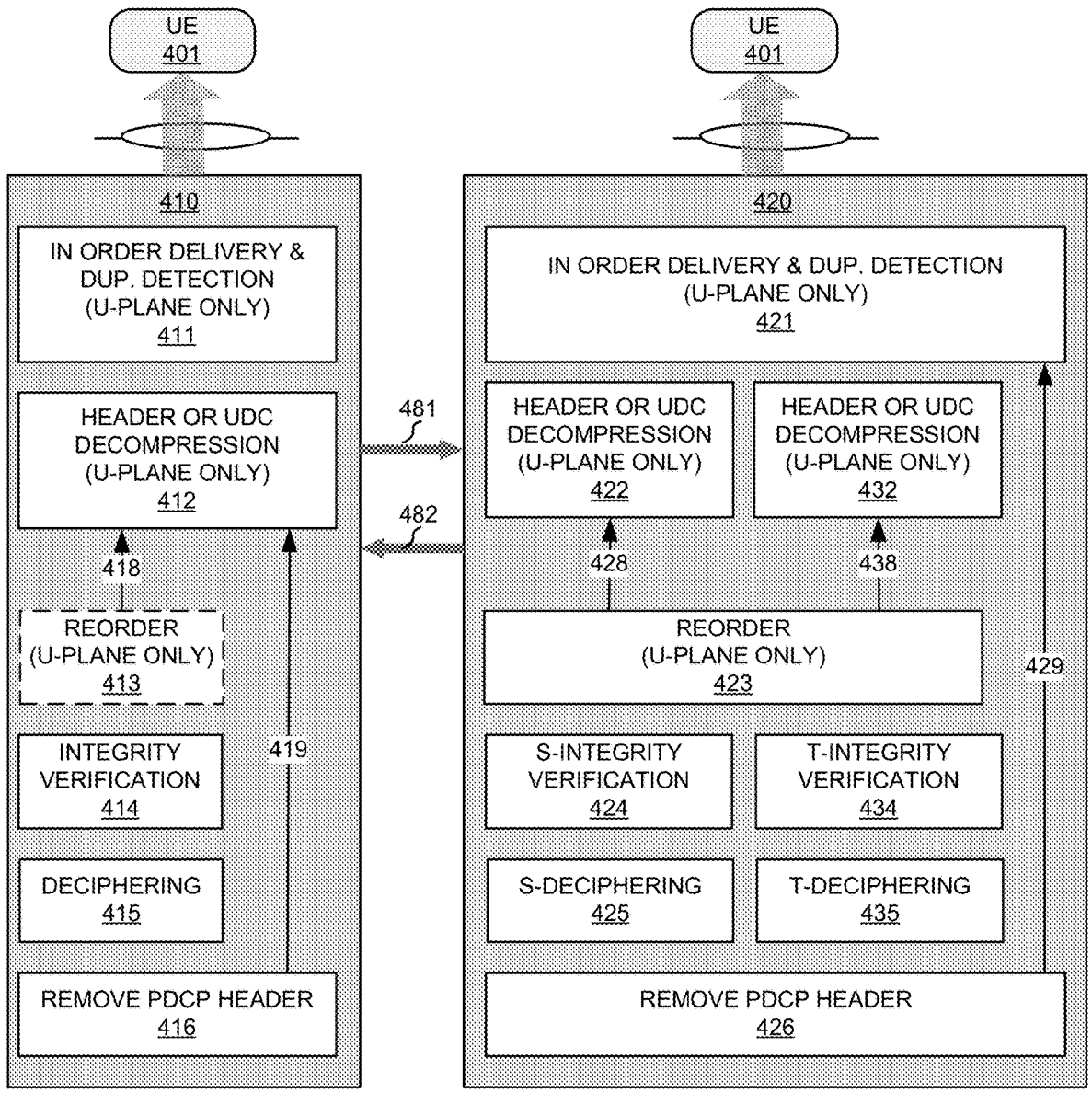
FIG. 4 illustrates an exemplary transition diagram between the normal receiving PDCP entity and the DAPS receiving PDCP entity in accordance with embodiments of the current invention.

FIG. 4 illustrates an exemplary transition diagram between the normal receiving PDCP entity and the DAPS receiving PDCP entity in accordance with embodiments of the current invention. A normal receiving PDCP entity 410 of a UE 401 receives data from lower layers of the UE. At step 416, normal receiving PDCP entity 410 removes PDCP header. If the received packets are not associated with a PDCP service data unit (SDU), at step 419, the data packets are sent to the header decompression unit, otherwise, deciphering and security functions are performed before sent to the header decompression at step 418. At step 415, normal receiving PDCP entity 410 performs deciphering using deciphering keys associated with the source cell. At step 414, the normal receiving PDCP entity 410 performs integrity verification with the source security key. Optionally, at step 413, a u-plane only reordering is performed. At step 412, the u-plane only header or uplink data compression (UDC) decompression is performed. At step 411, the data are in-order delivered with duplication detection to the application layer of UE 401.

A DAPS receiving PDCP entity 420 of the UE 401 receives data from lower layers of the UE. The data packets come from both the source cell and the target cell. At step 426, the DAPS receiving PDCP entity 420 removes PDCP header. If the received packets are not associated with a PDCP service data unit (SDU), at step 429, the data packets are sent to the in-order-delivery procedure, otherwise, deciphering and security functions are performed before sent to the source header decompression for source data packets at step 428 or to the target header decompression for target data packets at step 438. At step 425, deciphering using source deciphering keys associated with the source cell is performed for the source data packets. At step 435, deciphering using target deciphering keys associated with the target cell is performed for the target data packets. At step 424, integrity verification with the source security key is performed for the source data packets. At step 434, integrity verification with the target security key is performed for the target data packets. At step 423, a u-plane only reordering is performed. At step 422, the u-plane only header or UDC decompression is performed for the source packets. At step 432, the u-plane only header or UDC decompression is performed for the target packets. At step 421, the data are in-order delivered with duplication detection to the application layer of UE 401.

In one embodiment, the normal receiving PDCP entity 410 is reconfigured to the DAPS receiving PDCP entity 420, at step 481, upon receiving reconfiguration indication/message and the DAPS is configured. In another embodiment, the DAPS receiving PDCP entity 420 is reconfigured to the normal receiving PDCP entity 410, at step 482, upon receiving reconfiguration indication/message and the RLC entity associated with the DAPS receiving PDCP entity is released for a radio bearer.

Figure 5:
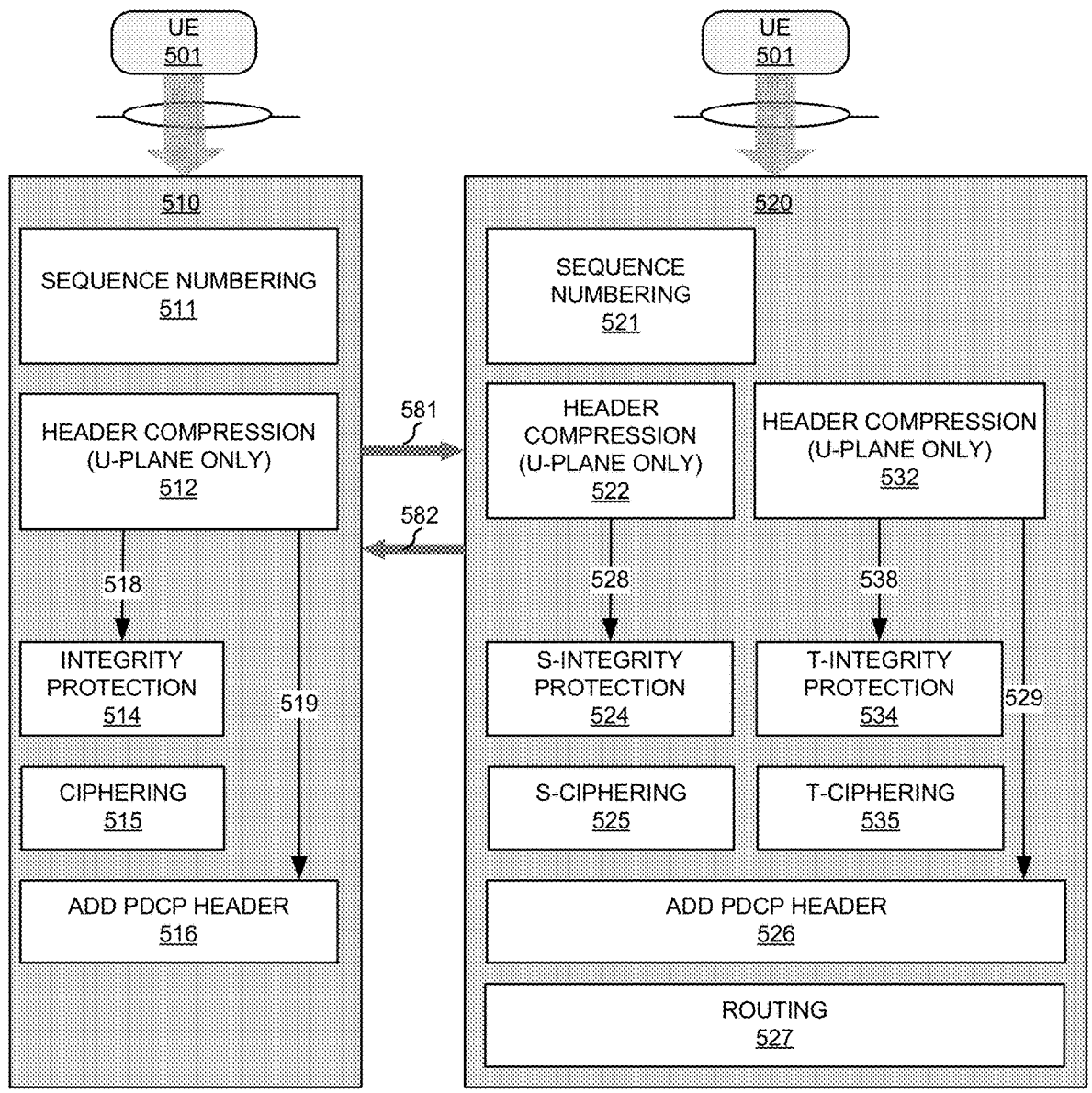
FIG. 5 illustrates an exemplary transition diagram between the normal transmitting PDCP entity and the DAPS transmitting PDCP entity in accordance with embodiments of the current invention.

FIG. 5 illustrates an exemplary transition diagram between the normal transmitting PDCP entity and the DAPS transmitting PDCP entity in accordance with embodiments of the current invention. A normal transmitting PDCP entity 510 of a UE 501 receives data from upper layers of the UE. At step 511, sequence numbering (SN) is performed. At step 512, u-plane only header compression is performed. If the received packets are not associated with a PDCP SDU, at step 519, the data packets are sent to adding PDCP header procedure, otherwise, at step 518, ciphering and security functions are performed before sent to the adding PDCP header. At step 514, integrity protection is performed. At step 515, ciphering is performed. At step 516, PDCP header is added.

A DAPS transmitting PDCP entity 520 of the UE 501 receives data from upper layers of the UE. At step 521, sequence numbering (SN) is performed. At step 522 and step 532, u-plane only header compression is performed for source data packets and target data packets, respectively. If the received packets are not associated with a PDCP SDU, at step 529, the data packets are sent to adding PDCP header procedure, otherwise, at step 528 and step 538, ciphering and security functions are performed before sent to the adding PDCP header. At step 524, integrity protection is performed for the source data packets. At step 534, integrity protection is performed for the target data packets. At step 525, ciphering is performed for the source data packets. At step 535, ciphering is performed for the target data packets. At step 526, PDCP header is added. At step 527, routing is performed.

In one embodiment, the normal transmitting PDCP entity 510 is reconfigured to the DAPS transmitting PDCP entity 520, at step 581, upon receiving reconfiguration indication/message and the DAPS is configured. In another embodiment, the DAPS transmitting PDCP entity 520 is reconfigured to the normal transmitting PDCP entity 510, at step 582, upon receiving reconfiguration indication/message and the RLC entity associated with the DAPS transmitting PDCP entity is released for a radio bearer.

Figure 6:
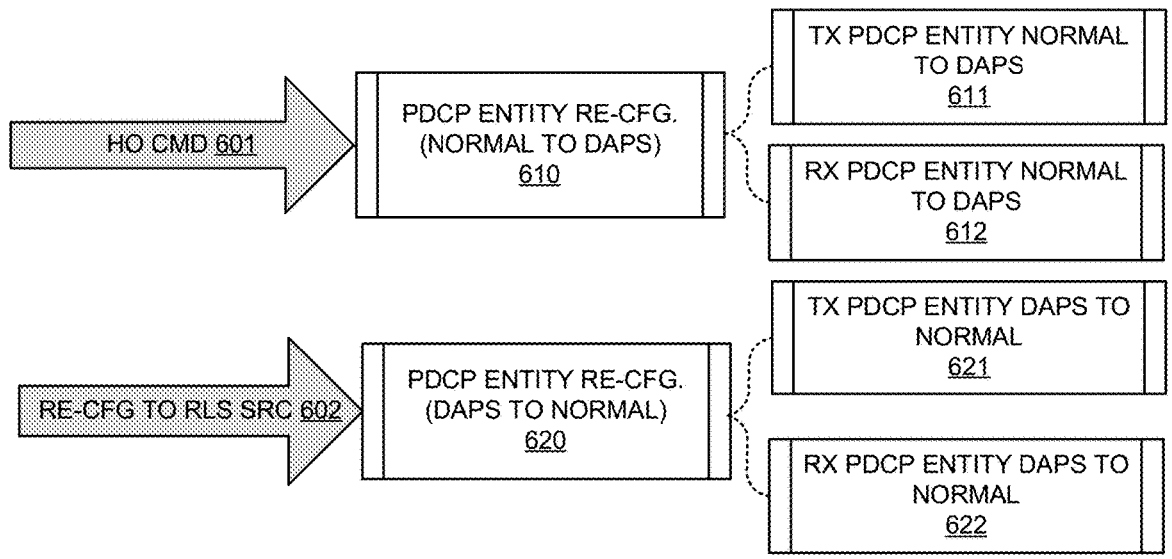
FIG. 6 illustrates an exemplary RRC procedure of PDCP reconfiguration for the change between normal and DAPS PDCP when performing HO with dual active protocol stacks in accordance with embodiments of the current invention.

FIG. 6 illustrates an exemplary RRC procedure to control PDCP reconfiguration for the change between normal and DAPS PDCP when performing HO with dual active protocol stacks in accordance with embodiments of the current invention. In one novel aspect, the PDCP reconfiguration, including reconfiguring from the normal PDCP entity to the DAPS PDCP entity and vice versa, is performed upon detecting PDCP reconfiguration indication or message. In one embodiment, the PDCP reconfiguration indication is the handover command with dapsConfig flag for reconfiguring to the DAPS PDCP entity, or RRCReconfiguration message with source cell release, e.g. daps-SourceRelease, for reconfiguring to the normal PDCP entity.

Upon reception of the HO command with any DAB configured with dapsConfig flag at step 601, the RRC layer requests PDCP layer to perform PDCP reconfiguration to change the normal PDCP to DAPS PDCP at step 610. In one embodiment, both the transmitting PDCP entity 611 and the receiving PDCP entity 612 are changed from normal to DAPS PDCP). Upon reception of RRC reconfiguration message to release the source cell at step 602, the RRC layer requests PDCP layer to perform PDCP reconfiguration to change the DAPS PDCP to normal PDCP at step 620. Both the transmitting PDCP entity 621 and the receiving PDCP entity 622 are changed from DAPS PDCP to the normal PDCP entity. In one embodiment, if the transmitting PDCP entity is changed upon reception of the HO command with dapsConfig flag, the UE switches to use the integrity protection function, cipher function and the header compression function corresponding to the target cell upon reception of the first UL grant of the target cell.

Figure 7:
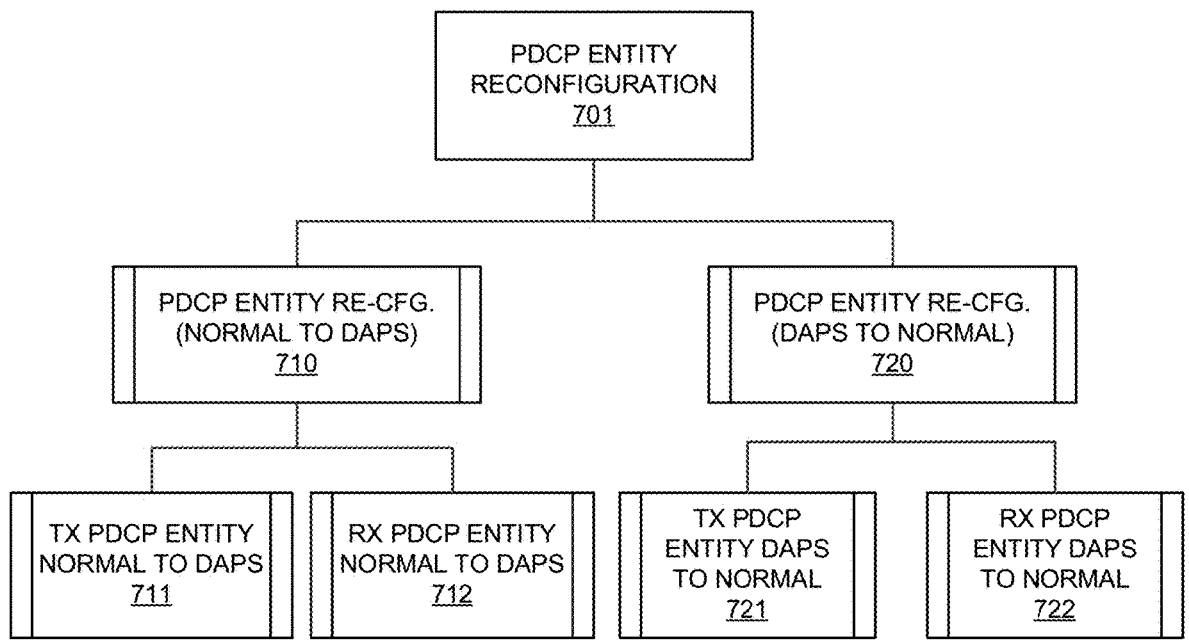
FIG. 7 illustrates an exemplary diagram of PDCP entity reconfiguration with change from normal PDCP to DAPS PDCP (PDCP extended) and change from DAPS PDCP to normal PDCP (PDCP restoration) procedures in accordance with embodiments of the current invention.

FIG. 7 illustrates an exemplary diagram of PDCP entity reconfiguration with change from normal PDCP to DAPS PDCP (PDCP extended) and change from DAPS PDCP to normal PDCP (PDCP restoration) procedures in accordance with embodiments of the current invention. In one novel aspect, PDCP entity is reconfigured for the DAPS. At step 701, PDCP reconfiguration request is received by the PDCP entity. The PDCP reconfiguration request can be a request to reconfigure the normal PDCP to the DAPS PDCP at step 710. Normal PDCP is changed to DAPS PDCP for transmitting PDCP entity at step 711 and receiving PDCP entity at step 712 to establish header compression, ciphering and integrity protection function for the target cell, each applying the established function for ciphering/deciphering, compression/decompression, and integrity protection/verification. The PDCP reconfiguration request can be a request to reconfigure the PDCP to the normal PDCP by releasing the source cell at step 720. DAPS PDCP is changed to normal PDCP for transmitting PDCP entity at step 721 and receiving PDCP entity at step 722.

Figure 8:
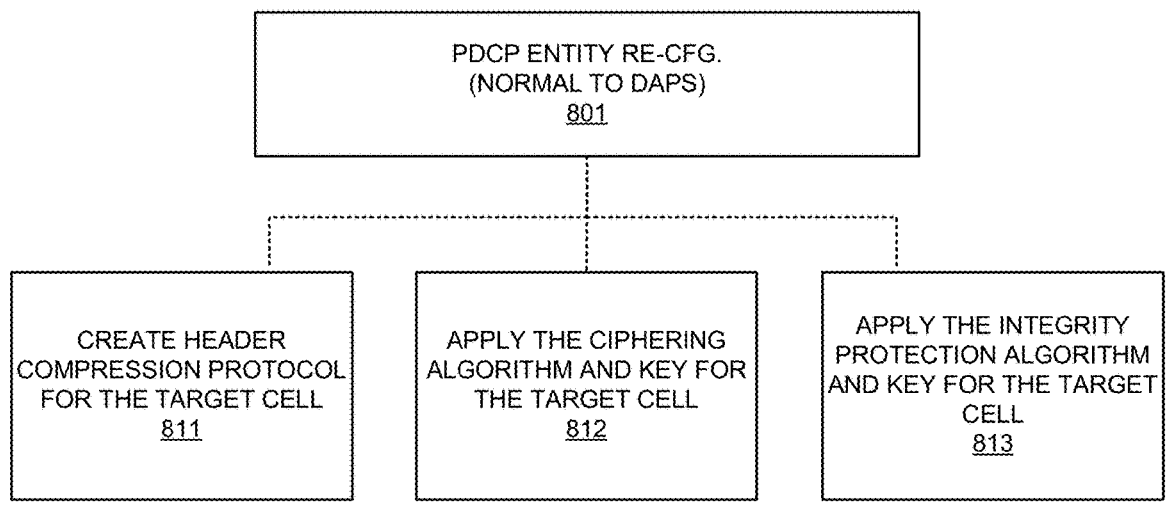
FIG. 8 illustrates exemplary flow charts for PDCP reconfiguration to the DAPS PDCP in accordance with embodiments of the current invention.

FIG. 8 illustrates exemplary flow charts for PDCP reconfiguration for the change from normal to DAPS PDCP in accordance with embodiments of the current invention. When the PDCP entity reconfiguration indication is received at step 801, the PDCP performs PDCP reconfiguration to change the normal PDCP to the DAPS PDCP. It is associated with the target cell for both downlink (DL) receiving PDCP and uplink (UL) transmitting PDCP. In one embodiment when upper layer request PDCP reconfiguration to change the normal PDCP to DAPS PDCP, the receiving PDCP entity continues to process the PDCP data protocol data units (PDUs) that are received from lower layers associated to the source cell as normal. The transmitting PDCP entity continues the process of the PDCP SDUs received from the upper layer as normal and transmits the PDCP data PDUs to the source cell. At step 811, the header compression protocol for the target cell is created/established as the configuration provided by upper layer. At step 812, the ciphering algorithm and key provided by upper layers for the target cell (if configured) is applied during the PDCP reconfiguration procedure. At step 813, the integrity protection algorithm and key provided by upper layers for the target cell (if configured) is applied during the PDCP reconfiguration procedure. Subsequently, the PDCP reordering function to reorder the packets received from both the lower layers of the source cell and the target cell is enabled. In one embodiment, if the reordering function is used before the PDCP entity is reconfigured, the on-going PDCP reordering procedure is not interrupted and a timer t-Reordering keeps as it is. And The DAPS PDCP entity switches to the target cell functions, including the compression, ciphering and integrity protection, upon receiving the first UL grant from the target cell.

Figure 9:
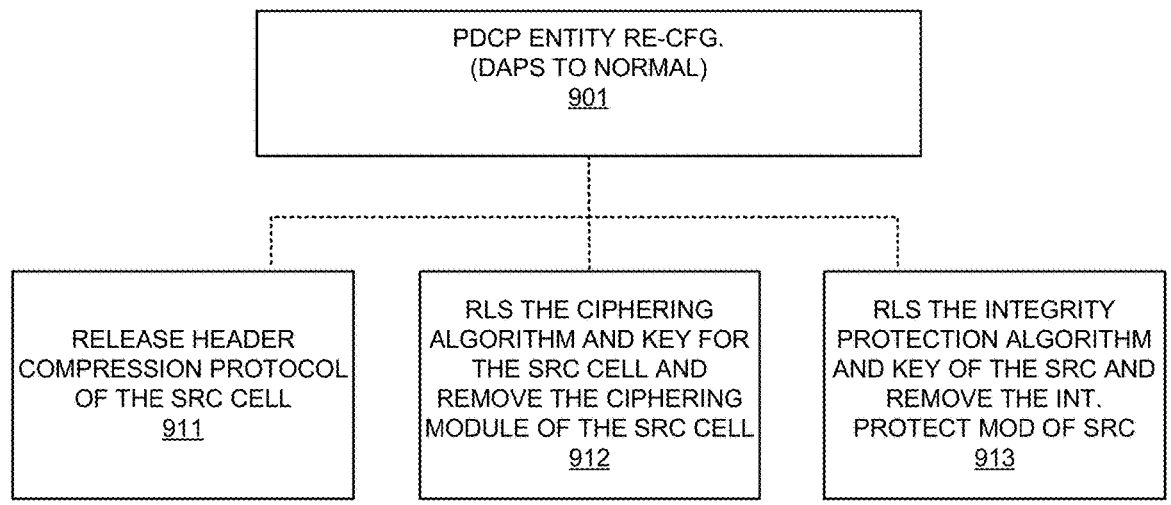
FIG. 9 illustrates exemplary flow charts for PDCP reconfiguration to change from DAPS PDCP to normal PDCP in accordance with embodiments of the current invention.

FIG. 9 illustrates exemplary flow charts for PDCP reconfiguration to change the DAPS PDCP to normal PDCP in accordance with embodiments of the current invention. When the PDCP entity reconfiguration indication is received at step 901, the PDCP performs PDCP reconfiguration to change the DAPS PDCP to normal PDCP. In one embodiment for the PDCP entity reconfiguration to change the DAPS PDCP to normal PDCP, when upper layers request a PDCP entity reconfiguration, the receiving PDCP entity continues to process the PDCP data PDUs that are received from lower layers associated to the target cell as normal. The transmitting PDCP entity continues to process the PDCP SDUs received from the upper layer as normal and transmitted the PDCP data PDUs to the target cell. At step 911, the header compression protocol for the source cell is released. At step 912, the ciphering algorithm and key for the source cell is released and the ciphering module of the source cell is removed. At step 913, the integrity protection algorithm and key of the source cell is released, and the integrity protection module of the source cell is removed. In one embodiment, PDCP status report is triggered and the PDCP status report is sent to the target cell. In one embodiment, if the receiving PDCP entity is reconfigured to the normal PDCP while the reordering function is configured, the PDCP stops and resets t-Reordering. In another embodiment, if the receiving PDCP is reconfigured to normal PDP while reordering function is not configured, the PDCP disables the reordering function during the reconfiguration procedure.

In one novel aspect, the UE detects DAPS flag indication requesting to maintain a user-place (u-plane) protocol of source cell with a source MAC entity while performing handover to a target cell. To reduce the handover interruption, the UE creates a target MAC entity for the target cell and reconfigures the RLC entity and the PDCP entity for the target DRBs.

Figure 10:
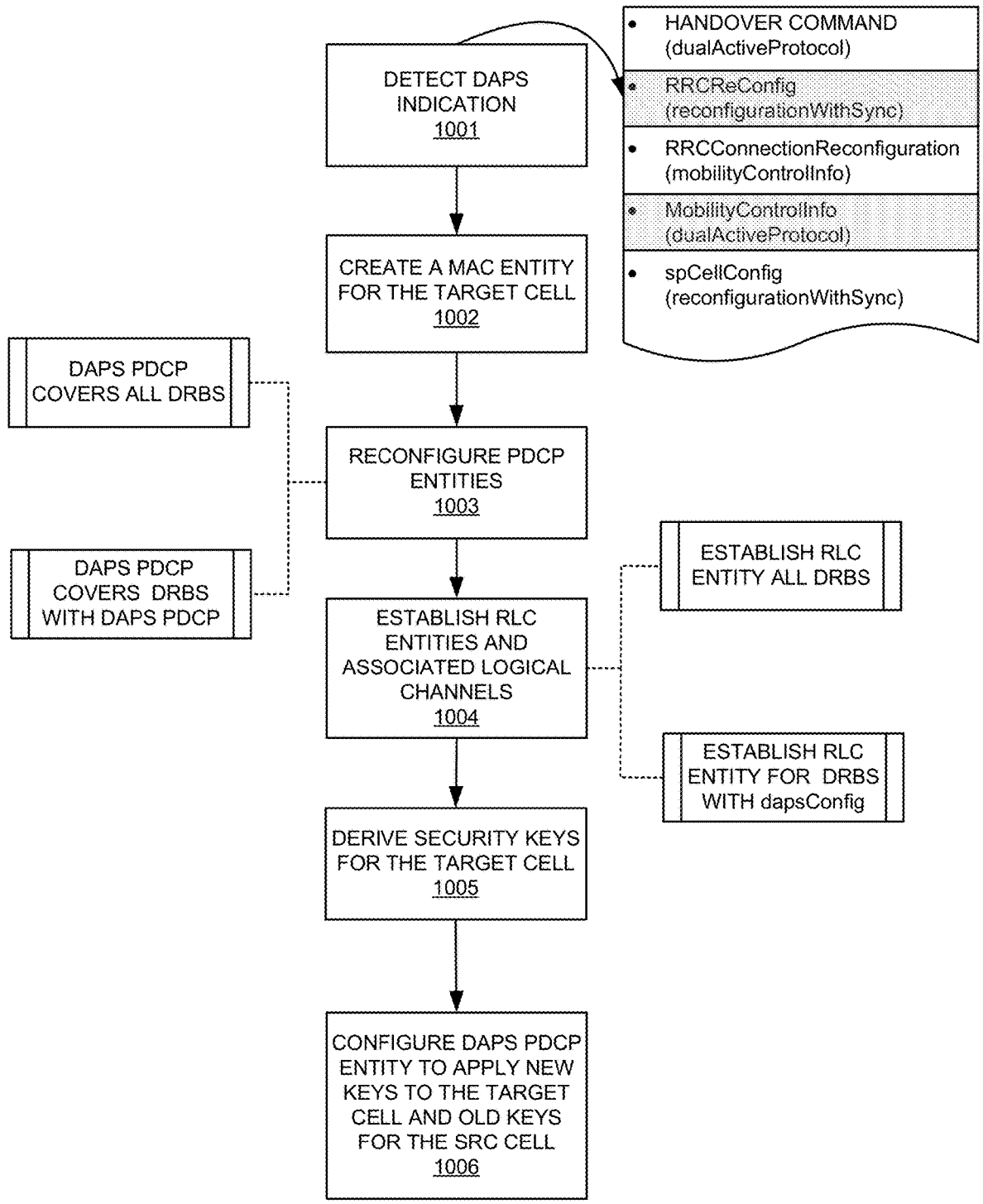
FIG. 10 illustrates an exemplary RRC procedure when performing HO with DAPS in accordance with embodiments of the current invention.

FIG. 10 illustrates an exemplary RRC procedure when performing HO with DAPS in accordance with embodiments of the current invention. At step 1001, a DAPS indication is detected. The DAPS indication can be an indication to change the normal PDCP entity to DAPS PDCP entity. For DAPS indication for reconfiguration for extended PDCP, the DAPS indication or the message indicates that UE needs to perform simultaneous transmission/reception with both the source cell and the target cell during the HO procedure. Therefore, UE needs to continue data transmission/reception with the source cell when performing random access with the target cell. The DAPS indication can be one or more of the exemplary indications:

HO command includes a flag, such as dapsConfig.
    RRCReconfig message with reconfigurationWithSync.
    RRCConnectionReconfiguration message with mobilityControlInfo.
    Flag dapsConfig is carried by mobilityControlInfo.
    spCellConfig with reconfigurationWithSync Upon detecting the DAPS indication, UE keeps the UP protocol for the source cell. The UE does not reset the MCG MAC entity for the source cell, does not re-establish PDCP for the DRBs of the source cell and does not re-establish RLC for the DRBs of the source cell. At step 1002, the UE creates a MAC entity for the target cell. In one embodiment, the MAC entity created for the target cell is also an MCG MAC entity. The UE has two MAC entities for the source cell and the target cell, respectively. At step 1003, the UE reconfigures the PDCP entities to include more PDCP functions. The normal type of PDCP entity is changed to the DAPS PDCP entity. In one embodiment, UE reconfigures/modifies the PDCP entities for all the DRBs established. In another embodiment, UE reconfigures/modifies the PDCP entities for the DRBs if the dapsConfig is set. In one embodiment, The PDCP parameters for the DAPS PDCP entity is provided by pdcp-Config, which is extended to include the required parameters for the target cell. At step 1004, the UE establishes additional RLC entities (and associated logical channels) for the DRBs and associates the RLC entities (and associated logical channels) to the corresponding DAPS PDCP entity. In one embodiment, UE establishes RLC entities for all the DRBs established. In one embodiment, UE only establishes RLC entities for the DRBs for which dapsConfig is set. At step 1005, the UE derives the keys of the target cell. At step 1006, the UE configures the DAPS PDCP entity to apply the new keys of the target cell for the data transmission/reception to/from the target cell and continues to use the old keys of the source cell for data transmission/reception to/from the source cell.

Figure 11:
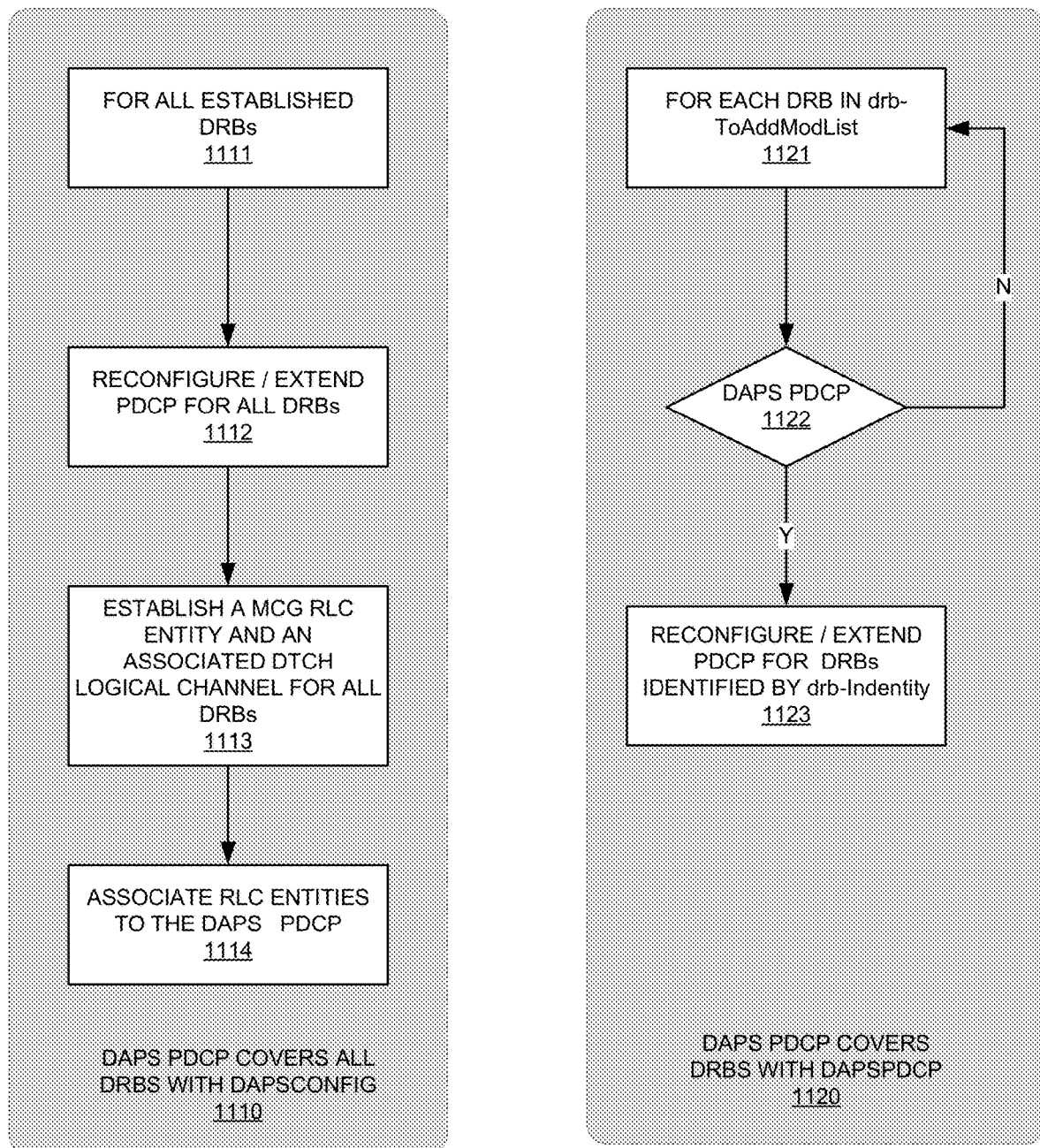
FIG. 11 illustrates exemplary flow charts to reconfigure the PDCP entity for all established DRBs or only for DRBs if the dapsConfig is set in accordance with embodiments of the current invention.

FIG. 11 illustrates exemplary flow charts to reconfigure the PDCP entity for all established DRBs or only for DRBs if the dapsConfig is set in accordance with embodiments of the current invention. In one embodiment (1110), UE reconfigures/modifies the PDCP entities for all the DRBs established. In another embodiment (1120), the UE reconfigures/modifies the PDCP entities for the DRBs if the dapsConfig is set. For embodiment 1110, at step 1111, the UE considers all established DRBs. At step 1112, the UE reconfigures the PDCP entities for all the DRBs configured with DAPS indication. At step 1113, the UE establishes a new MCG RLC entity and an associated dedicated traffic channel (DTCH) logical channel for all DRBs. At step 1114, the UE associates these RLC entities with the DAPS PDCP entities with the same value of drb-Identity within the current UE configuration.

For embodiment 1120, UE reconfigures the PDCP entities for the DRBs if the dapsConfig is set for the DRB. At step 1121, the UE considers each DRB with the dapsConfig flag, each DRB is identified by the drb-Identity in the drb-ToAddModList provided by the network. At step 1122, the UE checks if the dapsConfig is set for each DRB. For DRB addition/modification, for each drb-Identity value included in the drb-ToAddModList that is part of the current UE configuration, if the dapsConfig is set, the UE determines whether the dapsConfig flag is set for the corresponding DRB. If the dapsConfig flag is set, at step 1123, the PDCP entity of this DRB performs PDCP reconfiguration procedure to change the normal PDCP to DAPS PDCP. If step 1122 determines no, the DAPS PDCP is not reconfigured for the corresponding DRB.

Figure 12:
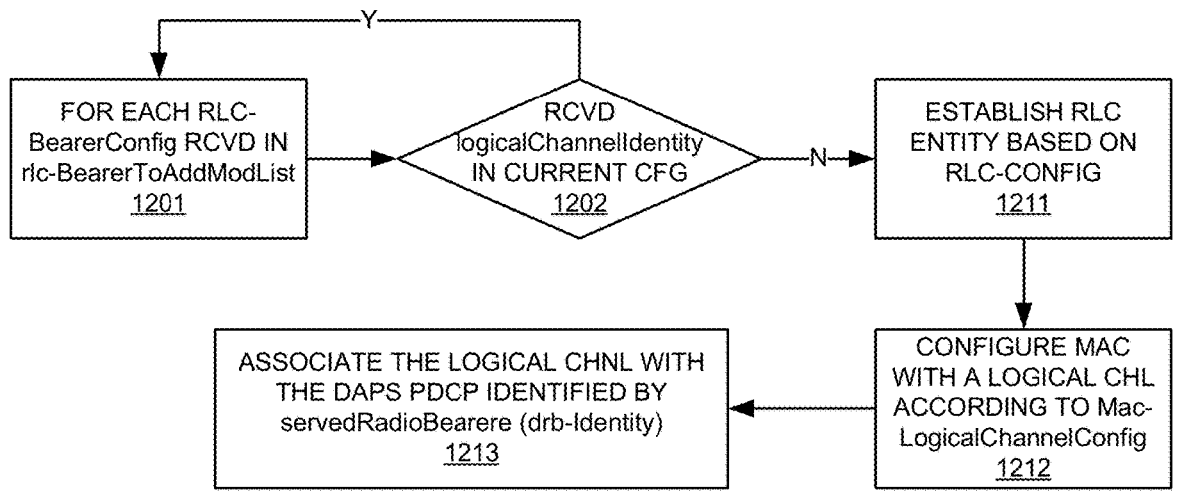
FIG. 12 illustrates exemplary flow charts to reconfigure the RLC entity in accordance with embodiments of the current invention.

FIG. 12 illustrates exemplary flow charts to reconfigure the RLC entity in accordance with embodiments of the current invention. At step 1201, the UE checks each RLC-BearerConfig received in the rlc-BearerToAddModList IE. At step 1202, the UE determines whether an RLC bearer with the received logicalChannelIdentity is currently configured by the UE. If step 1202 determines yes, no RLC reconfiguration is performed. If step 1202 determines no, at step 1211, the UE establishes an RLC entity in accordance with the received rlc-Config. At step 1212, the UE configures a MAC entity with a logical channel in accordance to the received mac-LogicalChannelConfig. At step 1213, the UE associates this logical channel with the DAPS PDCP entity identified by servedRadioBearer. In one embodiment, drb-Identity of servedRadioBearer is identical to the drb-Identity value in the drb-ToAddModList with dapsConfig configured. In one embodiment, the UE associates this logical channel with the keys/algorithm provided by the HO command and the new header compression protocol in the DAPS PDCP entity identified by servedRadioBearer. In another embodiment, the additional parameters for the DAPS PDCP entity is provided by extending PDCP-Config, which further provides the header (de)compression parameter for the target cell, when HO command is configured with dapsConfig.

Figure 13:
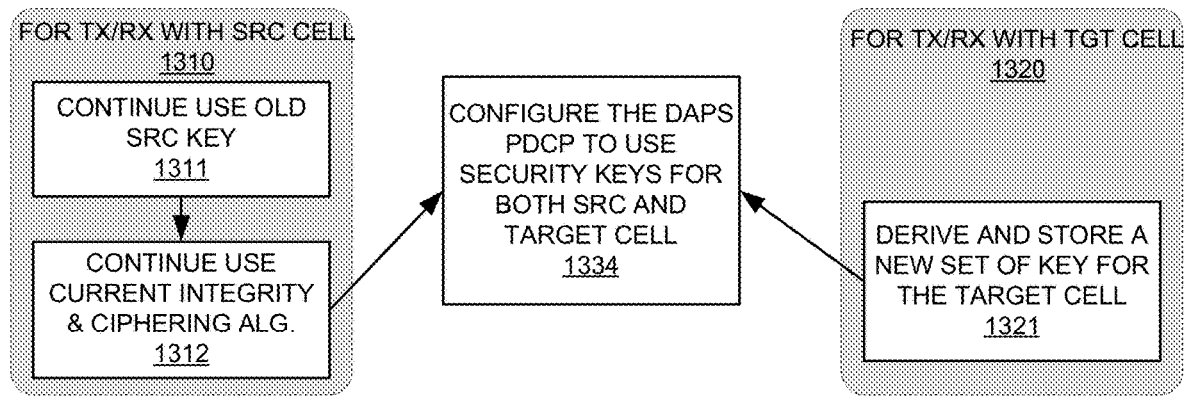
FIG. 13 shows an exemplary RRC procedure diagram to maintain two sets of security keys for both source cell and the target cell during HO in accordance with embodiments of the current invention.

FIG. 13 shows an exemplary RRC procedure diagram to maintain two sets of security keys for both source cell and the target cell during HO in accordance with embodiments of the current invention. In one embodiment, the UE maintains a source cell security key for transmitting and receiving (1310) and a target cell security key for transmitting and receiving (1320). In one embodiment for security key updating, such as in LTE, if dapsConfig is configured and the securityConfigHO is included in the RRCConnectionReconfiguration, at step 1311, the UE continues using the old source keys, such as KeNB, $K_{RRCint}$, $K_{UPint}$, $K_{RRCenc}$, $K_{UPenc}$. At step 1312, the UE continues using the current integrity algorithm and ciphering algorithm for data transmission/reception with the source cell. For the target cell (1320), at step 1321, the UE derives and stores a new set of keys for the target cell. At step 1334, the UE configures the DAPS PDCP entity applying the new keys of the target cell for the data transmission/reception to/from the target cell and the old keys for the source cell.

Figure 14:
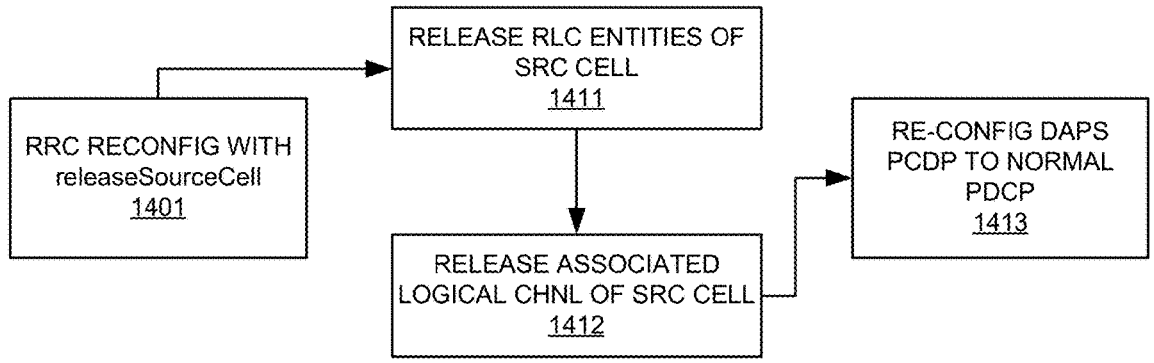
FIG. 14 illustrates an exemplary RRC procedure to release the connection with the source cell after HO is successfully completed in accordance with embodiments of the current invention.

FIG. 14 illustrates an exemplary RRC procedure to release the connection with the source cell after HO is successfully completed in accordance with embodiments of the current invention. At step 1401, the UE receives the RRC reconfiguration message includes a flag such as releaseSourceCell to release the connection with the source cell. At step 1411 and step 1412, for DRB addition/modification, the UE releases the RLC entities and the associated logical channels of the source cell and reconfigures the PDCP entity in accordance with the pdcp-Config. For each logicalChannelIdentity value that is to be released as the result of source cell release, the UE releases the RLC entity or entities and releases the corresponding logical channels. Additionally, the UE releases RLC bearer. At step 1413, the UE reconfigure the PDCP entity in accordance with the pdcp-Config. The PDCP reconfigures the DAPS PDCP entity to normal PDCP entity.

Figure 15:
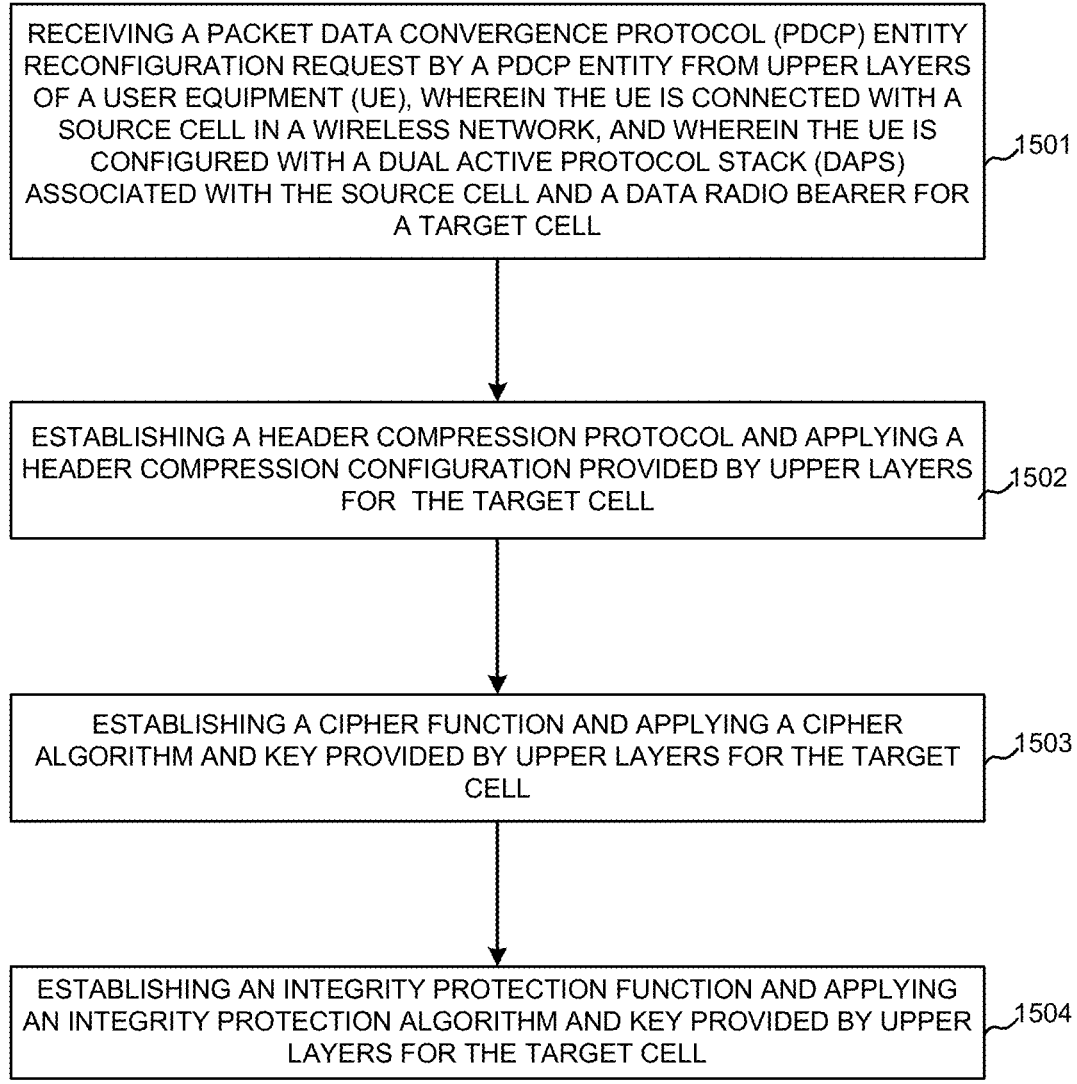
FIG. 15 illustrates an exemplary flow chart of a PDCP reconfiguration to change the normal PDCP to DAPS PDCP in in accordance with embodiments of the current invention.

FIG. 15 illustrates an exemplary flow chart of a PDCP reconfiguration to change from normal PDCP to DAPS PDCP in accordance with embodiments of the current invention. At step 1501, the PDCP entity receives a PDCP entity reconfiguration request from upper layers of a UE, wherein the UE is connected with a source cell in a wireless network, and wherein the UE is configured with a dual active protocol stack (DAPS) associated with the source cell and a data radio bearer for a target cell. At step 1502, the PDCP entity establishes a header compression protocol and applying a header compression configuration provided by upper layers for the target cell. At step 1503, the PDCP entity establishes a cipher function and applying a cipher algorithm and key provided by upper layers for the target cell. At step 1504, the PDCP entity establishes an integrity protection function and applying an integrity protection algorithm and key provided by upper layers for the target cell.

Figure 16:
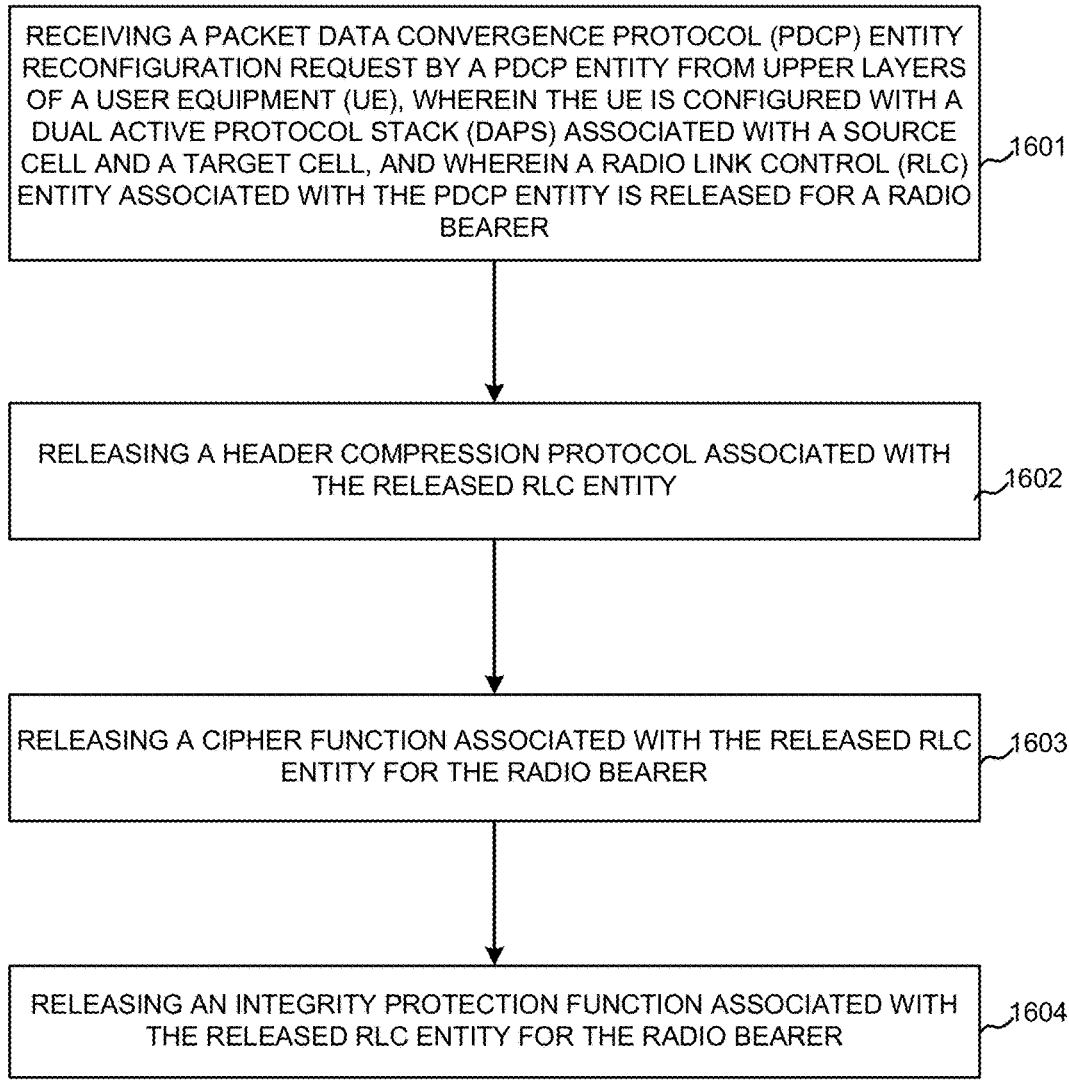
FIG. 16 illustrates an exemplary flow chart of a PDCP reconfiguration to change the DAPS PDCP to normal PDCP in accordance with embodiments of the current invention.

FIG. 16 illustrates an exemplary flow chart of a PDCP reconfiguration to change from DAPS PDCP to normal PDCP in accordance with embodiments of the current invention. At step 1601, the PDCP entity receives a PDCP entity reconfiguration request from upper layers of the UE, wherein the UE is configured with a DAPS associated with a source cell and a target cell, and wherein a RLC entity associated with the PDCP entity is released for a radio bearer. At step 1602, the PDCP entity releases a header compression protocol associated with the released RLC entity. At step 1603, the PDCP entity releases a cipher function associated with the released RLC entity. At step 1604, the PDCP entity releases an integrity protection function associated with the released RLC entity.

Figure 17:
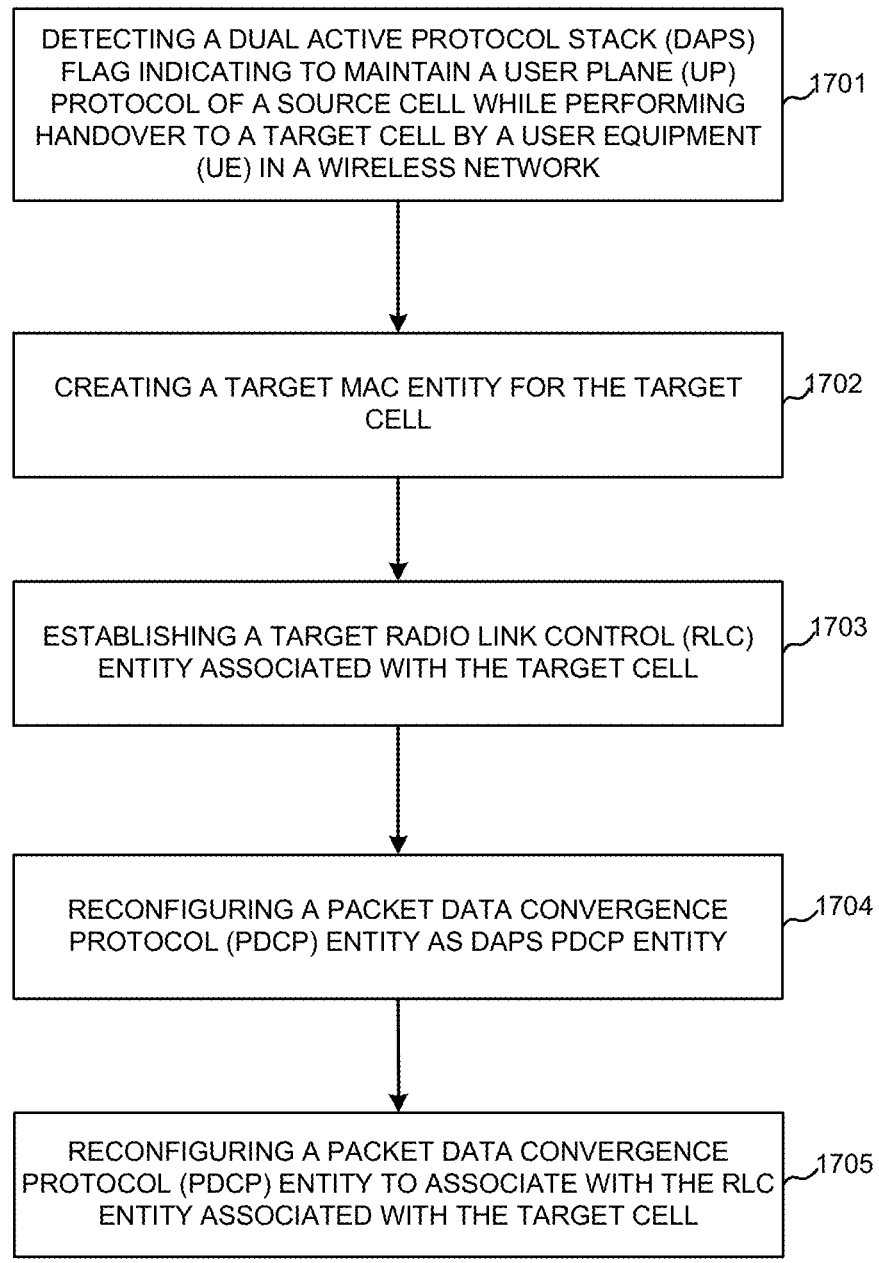
FIG. 17 illustrates an exemplary flow chart of a RRC reconfiguration in DAPS in accordance with embodiments of the current invention.

FIG. 17 illustrates an exemplary flow chart of an RRC reconfiguration in DAPS in accordance with embodiments of the current invention. At step 1701, the UE detects a DAPS flag indicating to maintain a UP protocol of a source cell while performing handover to a target cell in a wireless network. At step 1702, the UE creates a target MAC entity for the target cell. At step 1703, the UE establishes a radio link control (RLC) entity to associate with (DRBs of) the target cell. At step 1704, the UE reconfigures a PDCP entity as DAPS PDCP entity. At step 1705, the UE reconfigures the PDCP entity to associate with the RLC entity associated with the target cell.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   detecting a dual active protocol stack (DAPS) flag indicating to maintain a user plane (UP) protocol of a source cell while performing handover to a target cell by a user equipment (UE) in a wireless network;
   creating a target MAC entity for the target cell, wherein the UE is configured with a packet data convergence protocol (PDCP) entity and an associated source radio link control (RLC) entity;
   establishing a target RLC entity associated with the target cell;
   reconfiguring the PDCP entity as DAPS PDCP entity, wherein the reconfiguring the PDCP establishes new PDCP target function blocks corresponding to the target cell for the DAPS PDCP entity by establishing a target header compression protocol to apply a header compression configuration for the target cell, establishing a target cipher function to apply a cipher algorithm and key for the target cell, and establishing a target integrity protection function to apply an integrity protection algorithm and key for the target cell; and
   reconfiguring the DAPS PDCP entity to associate with the established RLC entity.

2. The method of claim 1, wherein the DAPS flag is detected when receiving at least one indication comprising a dapsConfig flag.

3. The method of claim 1, wherein the created MAC entity is a master cell group (MCG) MAC entity, and wherein the UE maintains a source MCG MAC entity and a target MCG MAC entity.

4. The method of claim 1, wherein parameters for the DAPS PDCP are included in pdcp-Config, which is extended to provide the parameters for the target cell.

5. The method of claim 1, wherein the PDCP entity is reconfigured to process all DRBs established, and wherein the PDCP entity is reconfigured to associate with the target RLC entity and an associated logical channel.

6. The method of claim 1, wherein the PDCP entity is reconfigured to process DRBs when dapsConfig is configured, and wherein the PDCP entity is reconfigured to associate with the target RLC entity and an associated logical channel.

7. The method of claim 1, further comprising: associating the target RLC entity and an associated logical channel with the DAPS PDCP entity with a same drb-Identity value.

8. The method of claim 7, further comprising:
   associating the target RLC entity with target keys and algorithm provided by a reconfiguration message; and
   associating the target RLC entity with a target header compression protocol for each DRB.

9. The method of claim 1, further comprising:
   releasing the source MAC entity and a connection with the source cell upon receiving a DAPS source release indication.

10. The method of claim 9, further comprising:
    releasing the RLC entity and an associated logical channel of the source cell; and
    reconfiguring the DAPS PDCP entity to normal PDCP entity.

11. A user equipment (UE), comprising:
    a transceiver that transmits and receives radio frequency (RF) signal in a wireless network;
    a dual active protocol stack (DAPS) circuit that detects a DAPS flag indicating to maintain a user plane (UP) protocol of a source cell while performing handover to a target cell in the wireless network, creates a target MAC entity for the target cell, wherein the UE is configured with a packet data convergence protocol (PDCP) entity and an associated source radio link control (RLC) entity, establishes a target RLC entity associated with the target cell, reconfigures the PDCP entity as DAPS PDCP entity, wherein the reconfiguring the PDCP establishes new PDCP target function blocks corresponding to the target cell for the DAPS PDCP entity by establishing a target header compression protocol to apply a header compression configuration for the target cell, establishing a target cipher function to apply a cipher algorithm and key for the target cell, and establishing a target integrity protection function to apply an integrity protection algorithm and key for the target cell, and reconfigures the DAPS PDCP entity to associate with the established target RLC entity.

12. The UE of claim 11, wherein the DAPS flag is detected when receiving at least one indication comprising a dapsConfig flag.

13. The UE of claim 11, wherein parameters for the DAPS PDCP are included in pdcp-Config, which is extended to provide the parameters for the target cell.

14. The UE of claim 11, wherein the PDCP entity is reconfigured to process all DRBs established, and wherein the PDCP entity is reconfigured to associate with the target RLC entity and an associated logical channel.

15. The UE of claim 11, wherein the PDCP entity is reconfigured to process DRBs when dapsConfig is configured, and wherein the PDCP entity is reconfigured to associate with the target RLC entity and an associated logical channel.

16. The UE of claim 11, wherein the PDCP entity is reconfigured to associate the target RLC entity and an associated logical channel with DAPS PDCP entity with a same drb-Identity value.

17. The UE of claim 11, wherein the UE releases the source MAC entity and a connection with the source cell upon receiving a DAPS source release indication.

18. The UE of claim 11, wherein the UE releases the RLC entity and an associated logical channel of the source cell, and reconfigures the DAPS PDCP entity to normal PDCP entity.

* * * * *